Oct. 11, 1966 S. F. ROYKA ET AL 3,278,739
ILLUMINATOR
Filed Jan. 2, 1964 2 Sheets-Sheet 1

STEPHEN F. ROYKA
GILBERT J. SHELDON
INVENTORS

BY *Arthur L. Nelson*
*Frank C. Parker*
ATTORNEYS

STEPHEN F. ROYKA
GILBERT J. SHELDON
INVENTORS

BY Arthur L. Nelson
Frank C. Parker
ATTORNEYS 3,278,739
ILLUMINATOR
Stephen F. Royka, Fairport, and Gilbert J. Sheldon, Irondequoit, N.Y., assignors to Bausch & Lomb Incorporated, Rochester, N.Y., a corporation of New York
Filed Jan. 2, 1964, Ser. No. 335,199
3 Claims. (Cl. 240—2)

This invention relates to an illuminator and more particularly to a central lighting means, directing illumination through a plurality of paths to control the direction and intensity of illumination.

The illumination of various objects may be accomplished through use of a single light source. This type of lighting however, has the inherent disadvantage of casting a shadow and causing insufficient overall illumination of the object. Even a plurality of light sources having means for directing the light can overcome some of the inherent disadvantages of a single source but the simplicity of the device is lacking. The use of an incandescent light source for directly illuminating an object also has the disadvantage of heating the object which in the case of a biological specimen is a definite disadvantage.

Accordingly, this invention is intended to provide a simplified illuminator whereby light from a single source of light is directed on a light transmitting means which diverts light through a plurality of strands to provide a means of directing cold light in any direction which is suitable to accomplish the desired lighting of the object.

It is an object of this invention to provide a plurality of illuminating paths transmitting light from a single light source.

It is another object of this invention to provide an illuminator transmitting a cold light from a single light source in a plurality of directions to create shadows, or eliminate shadows to provide the desired illumination.

It is a further object of this invention to provide an illuminating means having a variable intensity, or color control intermediate a central source and a plurality of light transmitting elements.

The objects of this invention are accomplished by providing a single light source within a suitable wavelength band width which directs maximum intensity of the light on a light receiving surface. The light receiving surface is defined by the terminal end of the integrated portion of a bundle of fibers. The bundle of fibers are optically insulated from each other and the end portions are fixed in their relative relationship to each other. The integrated portion of the bundle forms a single light receiving surface and the remaining portion including the opposite end of the bundle are separated into groups or strands forming subdivisions of the bundle. Each strand includes a plurality of a lesser number of optical fibers which carry a portion of the light through the bundle and a second end surface is formed on each end of the strands. A suitable means for attaching and holding the ends of the strands provides the desired direction for the light emerging from the exit end of the strands.

In this manner a single light source is used which provides a more efficient use of electrical energy as it eliminates line loss and resistance of the connectors and sockets required of a plurality of lights in lieu of the single source. The light transmitted through the fibers is a cold light and the positioning of the source of light may be at any convenient location and with suitable cooling means. The direction of the emergent light is controlled and also a suitable filter, or light attenuator may be positioned intermediate the light source and the bundle to provide the desired control of wavelength, or intensity.

Referring to the drawings, FIG. 1 illustrates the illuminator adapted to illuminating an object of a microscope.

Figure 1:
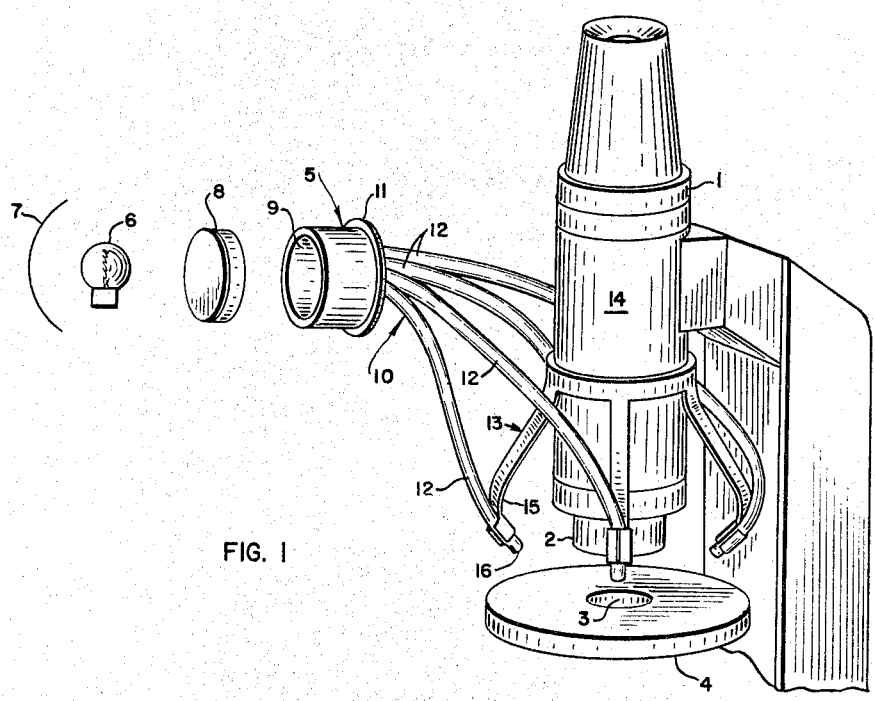

Referring to FIG. 1 the illuminator is shown adapted for use on a microscope 1. The microscope 1 includes an objective 2 for observation of an object at a point 3 on the table 4. The illuminator 5 includes a light source 6 operating with a reflector 7 and a lens 8 to project an image on the light receiving surface 9 of the integral end 11 of the bundle 10. The bundle 10 is received and banded within a sleeve which maintains a fixed relative position of each of the plurality of fibers forming the light receiving surface 9. A plurality of four strands 12 emerge from the integral end 11 of the bundle 10 which are supported on their opposite end by the spider 13. The spider is positioned on the outer periphery of the microscope barrel 14 and has deformable legs 15 which support the emergent ends 16 of each of the strands 12. The light emerging from the emergent end 16 is directed on the object 3 and removes all shadows ordinarily cast by a single lighting element. The number of strands used on a bundle of this type is limited only by the needs of the microscope and the object under observation.

Figure 2:
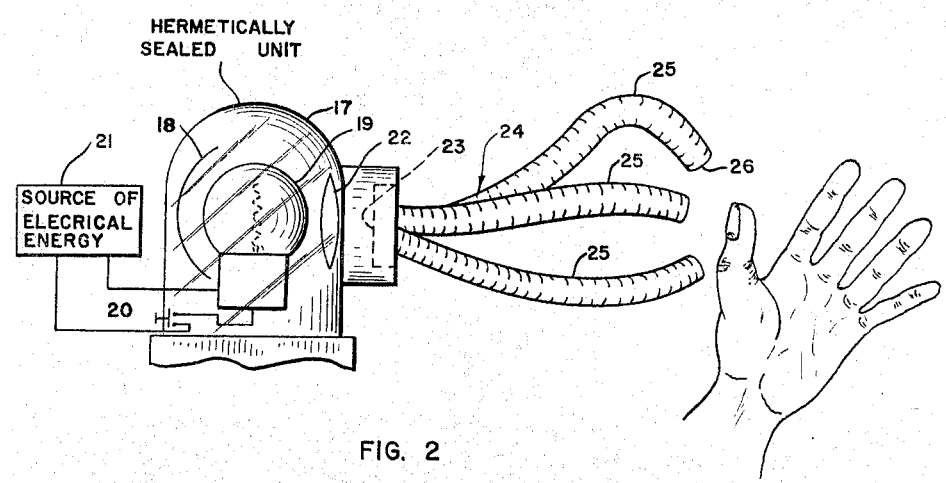
FIG. 2 illustrates a central source with suitable illuminating strands capable of directing light in any direction on a biological specimen.

FIG. 2 illustrates a hermetically sealed unit 17 enclosing a reflector 18 and a light source 19 with suitable electrical connectors and a switch 20. The electrical connectors connect the light source 19 through the switch 20 to the source of electrical energy 21. A unit of this type adapts itself well to hospitals or places in which arcing might cause an explosion due to anesthetics and other explosive gases which may be present in the area in which the illuminator is needed. A suitable lens system 22 focuses the light on the surface 23 of the bundle 24. The bundle 24 is integral to form a light receiving surface 23 comprising the ends of all the fibers at this point. The bundle separates to form the plurality of strands 25 which are encased within deformable sleeves. The sleeves are supported in the housing of the unit 17 and extend from the housing. The sleeve may be bent or deformed in any direction to provide a plurality of lights in various directions or a concentration of all emergent light from the end surfaces 26 of the strands. Advantages of a system like this are that it provides a cool light and does not create any danger in the nature of an explosion.

Figure 3:
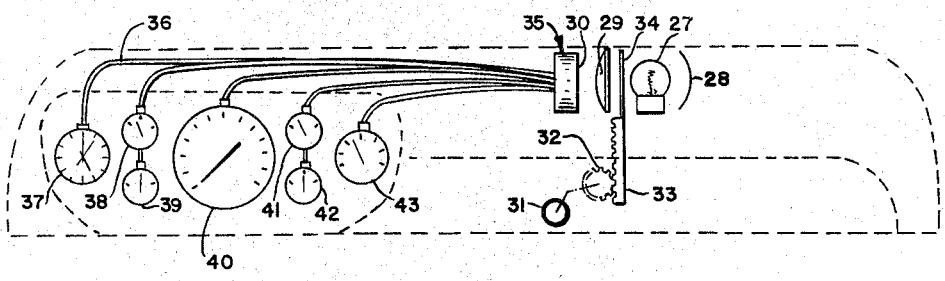
FIG. 3 illustrates the illuminator adapted for use in illuminating the dashboard of an automobile.

FIG. 3 illustrates an illuminator adapted to the dashboard of an automobile. The single light source 27 is positoined in a convenient location to permit cooling of the light. The light source 27 together with the reflector 28 projects light through the lens 29 onto a light receiving surface 30. A control knob 31 is connected to a pinion 32 operating on a rack 333. The rack 33 carries a color filter, or a light attenuator 34 which provides a control for wavelength, or intensity on the light outlet on the dashboard.

The integral end of the bundle 35 separates into a plurality of strands 36 each of which conducts light to an outlet surface adjacent an instrument for illumination of the instrument. Any number of outlets may be provided of which those illustrated are a clock 37, oil gage 38, ampere meter 39, speedometer 40, temperature gage 41, fuel indicator 42 and a tachometer 43. The dials of the various instruments provide the information to the operator of the vehicle and the outlets of plurality of strands 36 may be positioned to direct light on the dials as needed. The intensity of the light projected on the dials is controlled through the attenuator 34 which is controlled by the knob 31. This means of controlling intensity reduces the heating effect on the instrument gages and permits the mounting of the source 27 at any suitable location.

Figure 4:
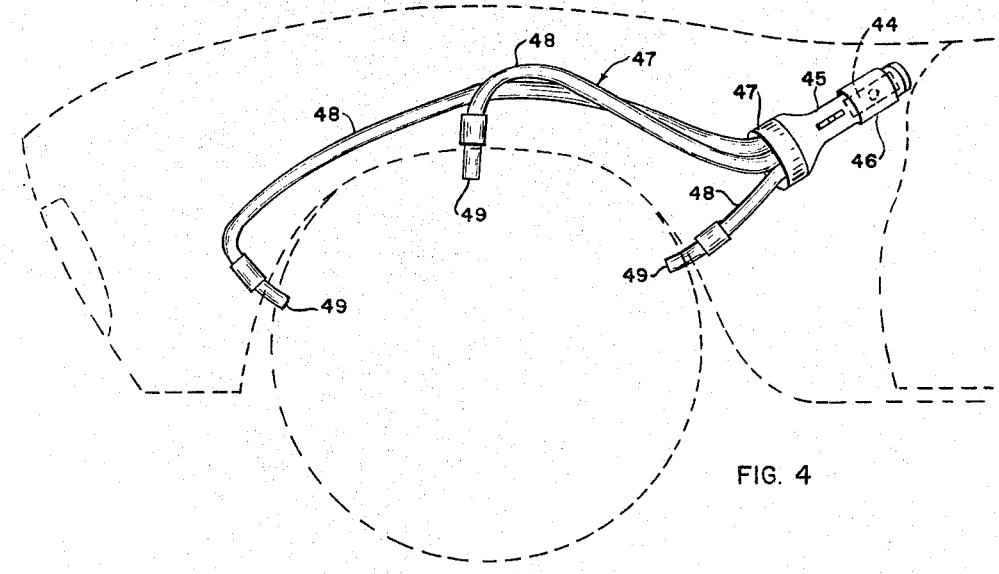
FIG. 4 illustrates a portable light source with adjustable light transmitters for providing suitable direction to the emergent light.

Referring to FIG. 4 a modified use is illustrated wherein an adapter 46 is positioned on the end of a flashlight 45 which is supported on a magnet 44 which retains its position on the side of the automobile body through the magnetic holding force. As the flashlight is turned on the light is projected through the bundle 47 including the plurality of strands 48 having projecting surfaces 49. This type of a use provides lighting in various areas on the wheel instead of necessitating the use of one hand to hold the light and change its direction whenever attention is directed on some other object. The function of the multi-directional illuminator adapted to use as indicated provides a very definite advantage because the supporting elements may be changed at will and the light is available wherever and whenever needed.

Figure 6:
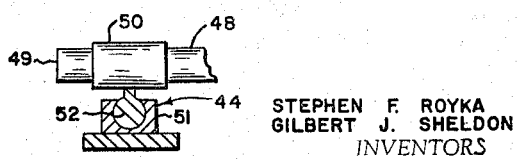
FIG. 6 illustrates a magnetic support for each of the outlets on the portable light source.

FIG. 6 illustrates the outlet end 49 of each of the strands 48 which is received within a band 50 pivotally connected to a magnetic support 51. The magnetic support 51 as illustrated is a ball and socket joint 52 which is rotatable in any direction to accommodate changing of the outlet for projecting the light on the object.

Figure 5:
FIG. 5 illustrates a plurality of fibers generally illustrating the principle of light transmission through the fibers.

FIG. 5 illustrates a plurality of fibers which are of small diameter and transmit the light by the principle of internal reflection on the periphery of each of the fibers. Each of the fibers are of a suitable material such as fiber glass having a larger index of refraction than the coating surface and which optically insulates each of the fibers from each other. This causes the light ray to continue through the fiber as it is reflected by the peripheral coating. The light emerges from the opposite end of the fiber and is directed generally in a parallel direction for illumination of an object under observation. The efficiency of the light transmission to a large degree is controlled by the efficiency of the reflecting surfaces which optically insulates the fibers from each other.

Referring to the general illustration of the illuminator the operation is substantially the same for all modifications. In FIG. 1 a light source 6 projects light by the use of the reflector 7 through the objective lens 8 onto the surface 9. The surface 9 is formed by the combination of all the ends of the fibers. The light projected onto the surface is projected in a manner such that it is within the receptance angle of the glass fibers being used. The light received on the surface 9 is then carried through each of the fibers to the projecting surface 16 of each of the strands 12. The strands 12 then direct the light in the direction which is controlled by the spider 13 which controls the emergent end of the strands. The strands project light onto the object 3 and illuminate the object from the direction as desired by the operator of the microscope. The shadows ordinarily created by a single off-axis light is eliminated because the light from all angles provides an even distribution of light. The light projected from the strands is also pure light with very little if any heat radiation. This is a definite advantage in the field of microscopes because of biological specimen which is illuminated to the degree necessary to observe the object in a microscope is often heated to the point that it may "fry." Accordingly, the illuminator provides a very definite advantage in directing light and not heat in the direction most desirable for best illumination. The efficiency of the lighting system may be greatly enhanced due to simplification of the electrical circuit and generally eliminating line loss and other losses generally associated with electrical transmission of this type.

The above description taken together with the illustrations sets forth the preferred embodiments of this invention and it is understood that other embodiments might be devised which fall within the scope of this invention which is defined by the attached claims.

We claim:
1. An illuminator comprising, a source of light radiating light, a bundle of optical fibers forming an end portion defining a light receiving surface, an optical system receiving light from said source and projecting the light on said surface, a plurality of strands of said fibers integral with the end portion of said bundle and providing a plurality of light paths, a light projecting surface formed on the emergent end of each of said strands, support means adapted for mounting on a microscope, said support means having separate individual elements supporting the light projecting ends of said strands to thereby provide a plurality of lighting means for illuminating the object of a microscope from various angles.

2. An illuminator comprising, a light source radiating light, a bundle of optical fibers defining an end portion having a single terminal end surface receiving light from said source for transmission of light through said fibers, a plurality of strands forming the remaining portion of said bundle of optical fibers and providing separate light transmitting paths, each of said fibers including a light transmitting core and a reflecting peripheral surface for transmission of light, support means mounted on a microscope and supporting the ends of said strands, each of said strands defining a light projecting end surface thereby providing a plurality of lighting means.

3. An illuminator comprising, a source of light radiating a luminous flux, a bundle of light transmitting fibers defining a single terminal end surface on one end of said fibers for receiving light, the lens system receiving light from said light source and projecting the light on said terminal end surface of said bundle of fibers, a plurality of strands formed by the remaining portion of said bundle of fibers providing a plurality of light paths, an end surface defined by the end of each of said strands for projecting light, a spider adapted for positioning on the barrel of a microscope having a plurality of legs for engaging the end of each strand and directing light from a plurality of different directions on the stage of a microscope to thereby provide illumination of an object without creating a shadow from the object.

References Cited by the Examiner
UNITED STATES PATENTS

| | | | |
|---|---|---|---|
| 2,198,443 | 4/1940 | Paul et al. | 240—8.4 X |
| 2,227,861 | 1/1941 | Petrone | 240—10 X |
| 2,589,569 | 3/1952 | Peter et al. | 240—1 X |
| 2,825,260 | 3/1958 | O'Brien | 240—1 X |
| 3,114,283 | 12/1963 | Gruner | 240—1 X |
| 3,148,355 | 9/1964 | Sliter et al. | |
| 3,163,080 | 12/1964 | Miller | 88—1 X |

OTHER REFERENCES

Kapany, N.S.: Fiber Optics; in Concepts of Classical Optics, by Strong, Appendix N., W. H. Freeman & Company, San Francisco, Calif. 1958.

NORTON ANSHER, *Primary Examiner.*

J. F. PETERS, JR., *Assistant Examiner.*